United States Patent
Steen et al.

(10) Patent No.: US 11,203,183 B2
(45) Date of Patent: Dec. 21, 2021

(54) SINGLE AND MULTI-LAYER, FLAT GLASS-SENSOR STRUCTURES

(71) Applicant: VAON, LLC, Bowling Green, KY (US)

(72) Inventors: Henry Steen, Bowling Green, KY (US); Quentin Lineberry, Bowling Green, KY (US); Vladimir Dobrokhotov, Bowling Green, KY (US)

(73) Assignee: VAON, LLC, Bowling Green, KY (US)

( * ) Notice: Subject to any disclaimer, the term of this patent is extended or adjusted under 35 U.S.C. 154(b) by 0 days.

(21) Appl. No.: 17/001,672

(22) Filed: Aug. 24, 2020

(65) Prior Publication Data

US 2020/0391483 A1     Dec. 17, 2020

Related U.S. Application Data

(63) Continuation-in-part of application No. 15/717,581, filed on Sep. 27, 2017, now abandoned, and a
(Continued)

(51) Int. Cl.
*B32B 17/10* (2006.01)
*C03C 17/00* (2006.01)
(Continued)

(52) U.S. Cl.
CPC ...... *B32B 17/10009* (2013.01); *B32B 17/069* (2013.01); *C03C 17/002* (2013.01); *H05B 3/06* (2013.01)

(58) Field of Classification Search
CPC . B32B 17/06; B32B 17/10009; B81B 7/0019; B81B 7/0025; B81B 7/0038;
(Continued)

(56) References Cited

U.S. PATENT DOCUMENTS 4,238,758 A   12/1980 Suzuki
4,338,281 A   7/1982 Treitinger et al.
(Continued)

FOREIGN PATENT DOCUMENTS

GB  2533294  6/2016
WO  WO19960001992  1/1996
WO  WO20030062196  7/2003

OTHER PUBLICATIONS

Arnold, C. et al., "Air Quality Monitoring and Fire Detection with the Karlsruhe Electronic Micronose Kamina," IEEE Sensor Journal, Aug. 2001, 1-22.
(Continued)

*Primary Examiner* — Tuan A Hoang
(74) *Attorney, Agent, or Firm* — 21st Century IP LLC; Kelly Hollowell

(57) ABSTRACT

A single and multi-layer flat glass-sensor structure and method of making the flat glass-sensor structure. The flat glass sensor structure comprises at least one flat glass layer, a sensor and a heater. The flat glass layer has a plurality of cutouts that are configured to "suspend" the sensor on top of or in plane with the flat glass layer. The sensor is an electrochemical wafer with at least one sensory element and flat glass connectors. Each flat glass connector is in minimal contact with at least one sensory sub-area. The heater is a resistive heating element that is on top of or in plane with the flat glass layer configured to heat the sensor. The flat glass connectors are configured to provide support for electrical leads to the heater and membrane. The flat glass connectors are also configured to provide temperature insulation of the suspended sensor.

10 Claims, 14 Drawing Sheets

Related U.S. Application Data continuation-in-part of application No. 16/413,398, filed on May 15, 2019, now Pat. No. 10,821,707, and a continuation-in-part of application No. 15/907,410, filed on Feb. 28, 2018, now Pat. No. 10,802,008.

(60) Provisional application No. 62/400,152, filed on Sep. 27, 2016, provisional application No. 62/672,735, filed on May 17, 2018, provisional application No. 62/464,629, filed on Feb. 28, 2017.

(51) Int. Cl.
*H05B 3/06* (2006.01)
*B32B 17/06* (2006.01)

(58) Field of Classification Search
CPC .......... B81B 7/0058; B81B 2203/0315; B81B 2203/0353; B81B 2201/06
See application file for complete search history.

(56) References Cited

U.S. PATENT DOCUMENTS

| | | | |
|---|---|---|---|
| 4,399,684 A | 8/1983 | Advani et al. | |
| 4,453,151 A | 6/1984 | Leary et al. | |
| 4,542,640 A | 9/1985 | Clifford | |
| 4,847,783 A | 7/1989 | Grace et al. | |
| 5,250,170 A | 10/1993 | Yagawara et al. | |
| 5,605,612 A | 2/1997 | Park et al. | |
| 5,783,154 A | 7/1998 | Althainz et al. | |
| 6,255,741 B1 | 1/2001 | Yoshihara et al. | |
| 6,235,243 B1 | 5/2001 | Fleischer et al. | |
| 6,465,281 B1 | 10/2002 | Xu | |
| 6,548,895 B1* | 4/2003 | Benavides | H01L 23/473 257/712 |
| 6,588,281 B2* | 7/2003 | Kurtz | G01L 9/0042 73/754 |
| 6,623,613 B1* | 9/2003 | Mathies | B01L 3/5025 204/450 |
| 6,829,131 B1* | 12/2004 | Loeb | H04R 19/005 361/115 |
| 7,258,011 B2* | 8/2007 | Nasiri | G01P 1/023 73/510 |
| 7,406,856 B2 | 8/2008 | Bottner et al. | |
| 8,349,635 B1 | 1/2013 | Gan | |
| 8,669,131 B1 | 3/2014 | Smith et al. | |
| 8,900,763 B2* | 12/2014 | Lundblad | F03G 7/005 429/422 |
| 2002/0148560 A1 | 10/2002 | Carr | |
| 2003/0045017 A1 | 3/2003 | Kubena | |
| 2004/0061207 A1 | 4/2004 | Ding | |
| 2004/0223884 A1* | 11/2004 | Chen | G01N 29/036 422/88 |
| 2006/0185420 A1 | 8/2006 | Nakagawa et al. | |
| 2006/0196248 A1 | 9/2006 | Nakano et al. | |
| 2009/0148347 A1 | 6/2009 | Lee et al. | |
| 2009/0159447 A1 | 6/2009 | Cui et al. | |
| 2009/0218668 A1* | 9/2009 | Zhe | H01L 24/48 257/680 |
| 2010/0294748 A1 | 11/2010 | Garner | |
| 2011/0023548 A1 | 2/2011 | Garner | |
| 2012/0142144 A1 | 6/2012 | Taheri | |
| 2013/0105921 A1* | 5/2013 | Najafi | G01C 19/574 257/415 |
| 2013/0140064 A1 | 6/2013 | Burberry et al. | |
| 2013/0223922 A1* | 8/2013 | Koval | B32B 17/06 403/270 |
| 2014/0061207 A1 | 4/2014 | Ding | |
| 2014/0130649 A1 | 5/2014 | Chang | |
| 2014/0138259 A1 | 5/2014 | Mickelson et al. | |
| 2014/0165654 A1* | 6/2014 | Bellman | B32B 7/06 65/32.1 |
| 2014/0217478 A1 | 8/2014 | Rothberg et al. | |
| 2014/0319628 A1 | 10/2014 | Nakane et al. | |
| 2015/0001651 A1* | 1/2015 | Faralli | B81C 3/00 257/417 |
| 2015/0118111 A1 | 4/2015 | Samarao et al. | |
| 2015/0140735 A1 | 5/2015 | Hosseini | |
| 2015/0218034 A1 | 8/2015 | Bigelow | |
| 2015/0224744 A1 | 8/2015 | Neuhaeusler | |
| 2015/0251944 A1 | 9/2015 | Brackley | |
| 2015/0267695 A1* | 9/2015 | Marsh | A61M 16/0057 128/205.24 |
| 2015/0290711 A1 | 10/2015 | Norfolk et al. | |
| 2016/0272532 A1 | 9/2016 | Fujii | |
| 2016/0346762 A1 | 12/2016 | Qu | |
| 2016/0346763 A1 | 12/2016 | Wahab et al. | |
| 2017/0008122 A1 | 1/2017 | Wieland | |
| 2017/0276627 A1 | 9/2017 | Dobrokhotov et al. | |
| 2018/0016179 A1 | 1/2018 | Canfield | |
| 2018/0017516 A1 | 1/2018 | Dobrokhotov et al. | |
| 2018/0086664 A1 | 3/2018 | Steen | |
| 2018/0215611 A1 | 8/2018 | Steen | |
| 2019/0270663 A1 | 9/2019 | Murashige | |
| 2019/0292086 A1 | 9/2019 | Murashige | |

OTHER PUBLICATIONS

Cao, K. et al., "Controlled Synthesis of Pd/Pt Core Shell Nanoparticles Using Area-selective Atomic Layer Deposition," Sci. Rep. 5, 8470; DOI:10.1038/srep08470, 2015.

Chen, D. et al., "Core-shell Au@Pd nanoparticles with enhanced catalytic activity for oxygen reduction reaction via core-shell Au@Ag/Pd constructions," Sci. Rep. 5, 11949; doi: 10.1038/srep11949, 2015.

Goschnick, J. et al., "Condition Monitoring for Intelligent Household Appliances," Sensors in Household Appliances, 2002, 5, 52-68.

Larin, A. et al., "Hybrid SnO2/TiO2 Nanocomposites for Selective Detection of Ultra-Low Hydrogen Sulfide Concentrations in Complex Backgrounds," 2016, 16, 1373.

Plichta, Armin et al., "Flexible Glass Substrates," Flexible Flat Panel Displays, 2005, Chapter 3, pp. 35-55, John Wiley & Sons Ltd.

The Karlsruhe Micro Nose, KAMINA, Application Note: 31052, 2008.

The Karlsruhe Micronose KAMINA: Novel technology for intelligent systems {brochure}.

Wlodarczyk, Krystian et. al., "Picosecond Laser Cutting and Drilling of Thin Flex Glass," Optics and Lasers in Engineering, 2016, 78, 64-74.

\* cited by examiner

US 11,203,183 B2

SINGLE AND MULTI-LAYER, FLAT GLASS-SENSOR STRUCTURES

CROSS REFERENCE TO RELATED APPLICATIONS

The present application is a Continuation-in-Part of U.S. application Ser. No. 15/717,581 filed Sep. 27, 2017, which claims priority to Provisional Application No. 62/400,152 filed Sep. 27, 2016. In addition, the present application is also a Continuation-in-Part of U.S. application Ser. No. 16/413,398 filed May 15, 2019, which claims priority to Provisional Application No. 62/672,735 filed May 17, 2018. In addition, the present application is also a Continuation-in-Part of U.S. application Ser. No. 15/907,410 filed Feb. 28, 2018, which claims priority to Provisional Application No. 62/464,629 filed Feb. 28, 2017. All of the priority applications are incorporated herein in their entirety.

FIELD OF THE INVENTION

The present invention is a single and multi-layer flat glass-sensor structure and method of making the single and multi-layer flat glass-sensor structure.

BACKGROUND OF THE INVENTION

Glass is inert and easier to clean than metal and plastic. It provides a surface that is smoother than metal and plastic. Due to its inherent transparency, light can shine into and through a glass device. However, constructing glass devices from multiple layers of glass has been a manufacturing challenge due to the difficulty of adhering multiple layers of glass together both efficiently and with high precision. Typically, a glue of some type is needed (e.g. glass flit) or high temperature fusion is required. Either of these "gluing" methods introduce manufacturing errors, are inherently slow (e.g., heat cycling can be time consuming), and do not allow for complex internal 3D geometries to be formed by and/or in the glass or delicate equipment (e.g., printed circuit board) to be housed within the structure.

In addition, thermal isolation and stability are critical elements contributing to the precise operation of detection devices such as electromechanical systems, detection devices in general and high temperature sensors in particular. Typically, there is intrinsic complexity in fabricating these devices. For example, the silicon on chip approach to electromechanical fabrication requires complicated multi-step and time-consuming processes in a clean room environment. Some silicon on chip fabrication processes require the use of extremely hazardous chemicals.

In view of the above, it would be beneficial to be able to manufacture single and multi-layer, flat glass structures that take advantage of the inherent properties of glass (e.g., inertness and transparency) but avoid the inconsistencies of glass manufacturing combined with manufacturing detection devices (hereafter "sensors") that achieve higher levels of thermal, mechanical and chemical resistance and stability compared to current state-of-the-art technology with silicon on chip.

SUMMARY OF THE INVENTION

The present invention is a single and multi-layer flat glass-sensor structure and method of making the flat glass-sensor structures. The flat glass sensor structure comprises at least one flat Mass layer, a sensor and a heater. The flat glass layer has a plurality of cutouts that are configured to "suspend" the sensor on top of or in plane with the flat glass layer with minimal contact between the sensor and the flat glass layer. The sensor is an electrochemical wafer (membrane") with at least one sensory element ("sensory sub-area") and flat glass connectors. Each flat glass connector is in minimal contact with at least one sensory sub-area. The heater is a resistive heating element that is on top of or in plane with the flat glass layer with minimal contact with the flat glass layer and is configured to heat the sensor. The flat glass connectors are configured to provide support for electrical leads to the heater and membrane. The flat Mass connectors are also configured to provide temperature insulation of the suspended sensor.

These and other aspects, which will become apparent during the following detailed description, have been achieved by the inventors' discovery of a new method of manufacturing multi-layer, flat glass structures.

DETAILED DESCRIPTION OF THE INVENTION

Figure 1:
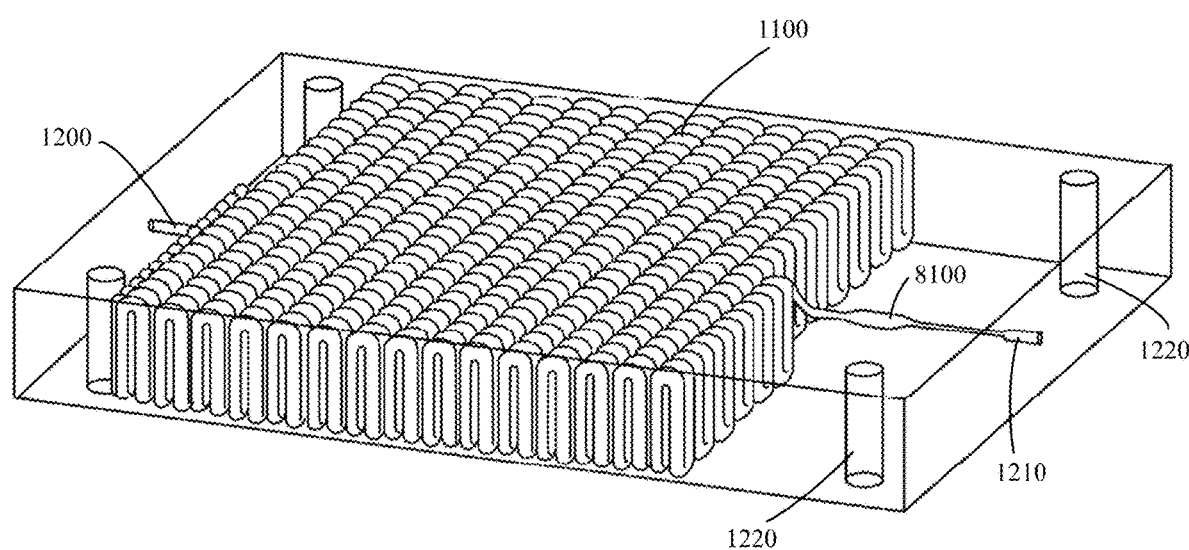
FIG. 1 shows a perspective view of a multi-layer, flat glass structure wherein a linear gas chromatography (GC) column is formed from the glass.

It has now been discovered that specific types of flat glass can be quickly laser cut, stacked, and formed into unitary multi-layer, flat glass structures. These unitary structures can be functional (e.g., designed for fluids to flow through them), and/or can house entire instruments or components thereof (e.g., mobiles phones, sensors, batteries, circuit boards, etc.). Because the structures can be transparent or translucent one can take advantage of the ability to direct light (e.g., UV light) into and/or through them.

Glass: Glass refers to a substance typically formed by melting sand, sodium carbonate (soda), and calcium oxide (lime)(silicate glass). The glass can also be formed with B203 and/or Al203 to form borosilicate, aluminosilicate or alumino-borosilicate glass. Additional additives can also be included during the formation of the glass or afterwards (e.g., polymer or metal oxide coatings). The glass can be transparent, translucent, or opaque. For translucent or opaque, the glass can be formed with this property. Alternatively, the glass can be modified to be translucent or opaque. Examples of modification include the addition of a translucent or opaque layer (e.g., a coating on one or both sides of one or more glass layers). The glass can be made or modified such that it reflects (in or out) and/or filters (in or out) certain wavelengths of light. In another aspect, a modified glass layer can further comprise another glass layer (e.g., to sandwich a coating to protect and/or enhance the modification).

Flat: Flat refers to both the geometry and the roughness of the glass. The flat glass used in the present invention is both planar (geometry) and smooth (roughness). Planar means that the top and bottom of each layer is in the same geometric plane. The flat glass has length, width, and thickness (height), with the thickness being very small (see examples of thickness below). Roughness is defined via a roughness average (Ra) and peak-to-valley roughness (Rpv). Examples of the roughness average (Ra) of the flat glass include less than 5, 4, 3, 2, 1, 0.9, 0.8, 0.7, 0.6, 0.5, 0.4, 0.3, 0.2, and 0.1 nm. Examples of peak-to-valley roughness (Rpv) include less than 50, 45, 40, 35, 30, 25, 20, 15, 10, and 5 nm.

When the structure is cylindrical, the flat glass is a plane curve (e.g., the flexible glass has wound around a spool).

Examples of the thickness of the flat glass include 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, to 225 µm, or greater.

As an example, the presently claimed invention uses glass that is stable to at least 600° C. Other examples of the temperature at which the glass remains stable includes 625, 650, 675, 700, 725, 750, 775, and 800° C.

Typically, the glass used in the present invention is flexible. For example, the glass is bendable or capable of forming a curved structure without shattering (e.g., a non-brittle substance). This allows for the glass to be formed into rolls, which can be unwound and cut during the present manufacturing process.

Examples of commercially available flat glass useful in the present invention include ultra-thin glass from Schott (e.g., AF 32® eco and AF 32® eco) as well as Corning® Willow® glass.

An advantage of the present unitary structures is that they form what is essentially a solid block (or cylinder) of hermetically sealed glass. The solid block (or cylinder) is sturdy and is resistant to numerous environmental challenges (freezing temperatures, high temperatures, precipitation, submersion in water, etc.).

In an aspect, the present invention provides a novel multi-layer, flat glass structure comprises a. a top flat glass layer; b. a bottom flat glass layer, and, c. at least four (4) internal flat glass layers, wherein the internal flat glass layers are each, individually, in contact with two other flat glass layers and the top and bottom flat glass layers are each, independently, in contact with one internal flat glass layer; the structure has a top, bottom, and four sides; and, at least one portion of glass (cut-out) is missing from a plurality of the layers.

In another aspect, a plurality of portions of glass (cut-outs) are missing from a plurality of the layers. In another aspect, a plurality of the missing glass portions in the plurality of layers are aligned to form a channel(s) (e.g., via) and/or a chamber(s). In another aspect, the structure, comprises at least 10 layers. In another aspect, the structure, comprises at least 50 layers. In another aspect, the structure, comprises at least 100 layers.

The number of flat glass layers (the total of top, bottom, and internal) is only limited by the design of the structures, specifically their thickness (height). Examples include 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, 200, 220, 240, 260, 280, 300, 320, 340, 360, 380, 400, 420, 440, 460, 480, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, and 2000. Examples also include: (a) 10-2000, (b) 10-1000, (c) 100-2000, (d) 100-1000, and (e) 100-500.

The geometry of the structures can vary depending on the function of the structure and/or the function of the components housed by the structure. In another aspect, the structure is a quadrilateral. Examples of quadrilaterals include square, rectangular, rhombus, parallelogram, trapezoid, and kite (adjacent pairs of equal length sides). In another aspect, the structure is round. Examples of round structures include circular, oblong, and egg-shaped. In another aspect, the unitary structure is a combination of part quadrilateral and par round. An example of the combination geometry is a structure that is round on one end and square or rectangular on the other.

In another aspect, the structure, further comprises: a plurality of fluid ports. The ports allow for gases and/or liquids to be introduced into and flow through the structure. Examples of the number of ports include 2, 3, 4, 5, 6, 7, 8, 9, and 10. The ports are connected to an internal structure (e.g., glass channel) for the gas or liquid to flow into and through. This is useful when the structure houses a sensor (e.g., a gas sensor or plurality of gas sensors) or functions as a gas chromatograph (GC) column. In another aspect, the ports allow for external tubing or connectors to be inserted into and/or connected with the structure. For internal connection, external tubing is plugged into the completed structure. The ports can be the glass of the structure itself or can be a non-flat glass connecter that is affixed to the inside of the completed structure. For glass ports, they can be formed in the structure during manufacture. Alternatively, ports can be formed (e.g., drilled) after the unitary structure has been made. For external connection, a connector can affix (e.g., glued, fused, or mechanically attached) to the structure thereby allowing a connection that is external to the structure. Attachment of the external connector can occur during the stacking of the layers or after the structure has been made.

In another aspect, the structure, further comprises electrical connectors. Examples of the number of electrical connectors include 2, 3, 4, 5, 6, 7, 8, 9, and 10-100. As an example, the connectors are electrical ports than can allow an electrical device (e.g., cable or wire) to be plugged into the structure. Another example of electrical connectors is external conducting pins (e.g., gold- or gold-plated pins) that extend from the inside of the structure to the outside of the structure, thereby allowing for clipping, crimping, plugging, or other ways of electrical connection.

Electrical connectors as well as electrical components housed (partially or fully) in the completed structure are typically electronically connected to one another via internal electronic connections. Examples of these connections include wires, traces, solder, and combinations thereof. Internal electronic connections are cut during the manufacturing process. The internal (and external, if present) electrical connections are inserted/laid/deposited during the manufacturing process or after the structure has been made. As an example, an electrical port can also be a glass inlet housing an electrical connector a wire, trace, or solder located inside or close enough to electronically communicate with a plug inserted therein.

In another aspect, the structure, further comprises: a plurality of mechanical pins 1220. In one embodiment these mechanical pins pass through the top and bottom of a single layer flat glass structure. In another embodiment, they also pass through the internal layers of the glass-sensor and at least into the top and bottom layers of a multi-layer structure. In one embodiment, one or more of the mechanical pins 1220 pass through at least one of the top or bottom of a single flat glass layer structure. In one embodiment, the mechanical pins pass through at least one of the top or bottom layers and extend beyond the structure of a multi-layer flat glass structure. The mechanical pins can be used to mount the structure (e.g., attach the structure to a vehicle or a computer case). The mechanical pins 1220 can also be screws or bolts or other types of fasteners. The mechanical pins 1220 can also be electrically conductive.

In another aspect, the mechanical pins 1220 are electrically conductive and are in electrical connection with at least one component housed in the structure. In another aspect, the plurality of mechanical pins extends beyond the bottom and/or top of the structure, are electrically conductive, and are in electrical connection with at least one of component housed in the structure. A glass structure that is a GC column is illustrated in FIG. 1 and FIG. 2 comprising an inlet port 1200, an outlet port 1210 and a glass column 1100.

Figure 2:
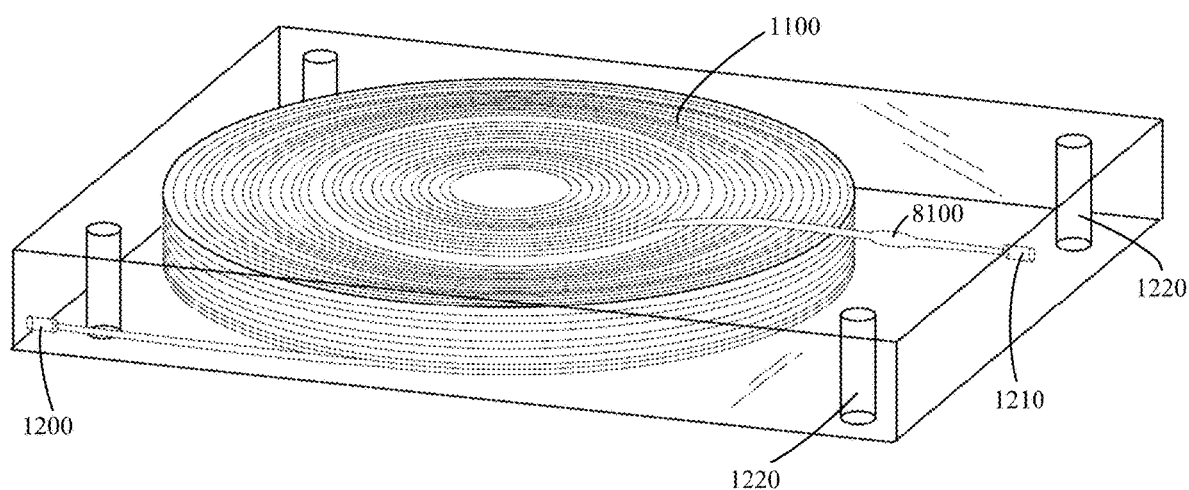
FIG. 2 shows a perspective view of a multi-layer, flat glass structure wherein a spiral GC column is formed from the glass.

In FIG. 1, the column is formed via a pathway in the internal layers. More specifically, the column runs up and down the height of the glass structure. At least the top and bottom layers house but do not contain the column. Additional internal layers adjacent to the top and/or bottom layers can also house, but not contain the column. The remaining inner layers have been cut (comprise missing portions or cut outs) so that when stacked a continuous glass channel (column) is formed. A linear column is shown in FIG. 1 while FIG. 2 shows a spiral column.

Typical column lengths for GC columns are 30 m and 60 m. Due to the ease of manufacturing the present GC columns, the column length is easily adjusted. Examples include 10, 15, 20, 25, 30, 35, 40, 45, 50, 55, 60, 65, 70, 75, 80, 85, 90, 95 and 00 m.

The internal diameter (I.D.) of the column is also variable as it is set by the laser cut. Examples of the column I.D. include 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, and 0.80 mm.

One of the advantages of the present invention is the ability to rapidly and precisely manufacture small, unitary, functional, single and multi-layer, flat glass structures. These structures avoid the need for tubing, connectors, and other parts that the glass can function as or for which the need is removed. For example, the GC structure in FIG. 1 can be 63.5 mm wide, 80 mm long, and 10 mm high. Other dimensions are possible. The length of the structure in FIG. 1 is determined by how much glass is cut off from the starting roll. The height is determined by the number of flat glass layers that are stacked and fused together. The width is usually set by the width of the roll. However, the width could be narrower than the roll if desired (e.g., one or both edges could be removed during manufacture). Alternatively, the width is determined by how much glass is cut off from the roll and the length corresponds to the width of the roll.

In another aspect, the GC column structure, further comprises: a detector. The structure can comprise a detector that is or contains a sensor 8100 or can be connected to a detector that is or contains a sensor 8100 via the outlet port 1210.

The GC detector can be a sensor such as those described in WO 2017/165567, WO 2018/160650, U.S. Pat. No. 10,132,769, US Patent Publication No. 2018/0086664, and US Patent Publication No. 2018/021561 1, the contents of which are incorporated by reference, in their entirety. Alternatively, the GC detector can be selected from: (a) flame ionization detector (FID), thermal conductive detector (TCD), akali flame detector (AFD), alkali flame ionization detector (AFID), catalytic combustion detector (CCD), flame photometric detector (FPD), electron capture detector (ECD), and combinations thereof (e.g., TCD in sequence with an FID). The detector can also be a spectrometer such as a mass spectrometer (MS) or NMR (nuclear magnetic resonance spectrometer), or a combination (e.g. GC-MS, GC-NMR or GC-MS-NMR).

In another aspect, the present invention provides a novel method of manufacturing a multi-layer, flat glass structure, the method, comprising: a. unrolling a spool of flat glass to provide a first length of flat glass; b. cutting the first length of glass away from the spool to form a bottom layer of flat glass, wherein the cutting optionally includes cutting a desired pattern into the first length of glass; c. placing the bottom layer of flat glass into an alignment frame; d. unrolling the spool to provide a second length of flat glass; e. cutting the second length of glass away from the spool to form an internal layer of flat glass, wherein the cutting optionally includes cutting a desired pattern into the second length of glass; f. placing the internal layer of flat glass into the alignment frame and in contact with the bottom layer; g. repeating steps (d)-(f) for each internal layer of flat glass, wherein each additional internal layer is placed in contact with another internal layer; h. unrolling the spool to provide a last length of flat glass; i. cutting the last length of glass away from the spool to form a top layer of flat glass, wherein the cutting optionally includes cutting a desired pattern into the last length of glass; j. placing the top layer of flat glass into the alignment frame and in contact with an internal layer; and k. fusing the stacked glass layers to form a multi-layer, flat glass structure.

Cutting of the flat glass layers is typically done via laser. Using a laser allows for precision, accuracy, and speed. The pieces cut out drop away as the glass layer is moved. Optionally, mechanical force (e.g., agitation, twisting, or forced air) is applied to the cut layer to ensure all unwanted glass pieces drop away.

In another aspect, at least one alignment hole is cut into each layer. Examples of the number of alignment holes include 1, 2, 3, and 4. The alignment hole(s) allows for a light to shine through each layer to ensure precise alignment. Alternatively, an alignment post (or posts) can be used and each layer can be stacked onto the alignment post (or posts) via the alignment hole(s). In this aspect, the alignment frame, comprises at least one alignment post.

Figure 3:
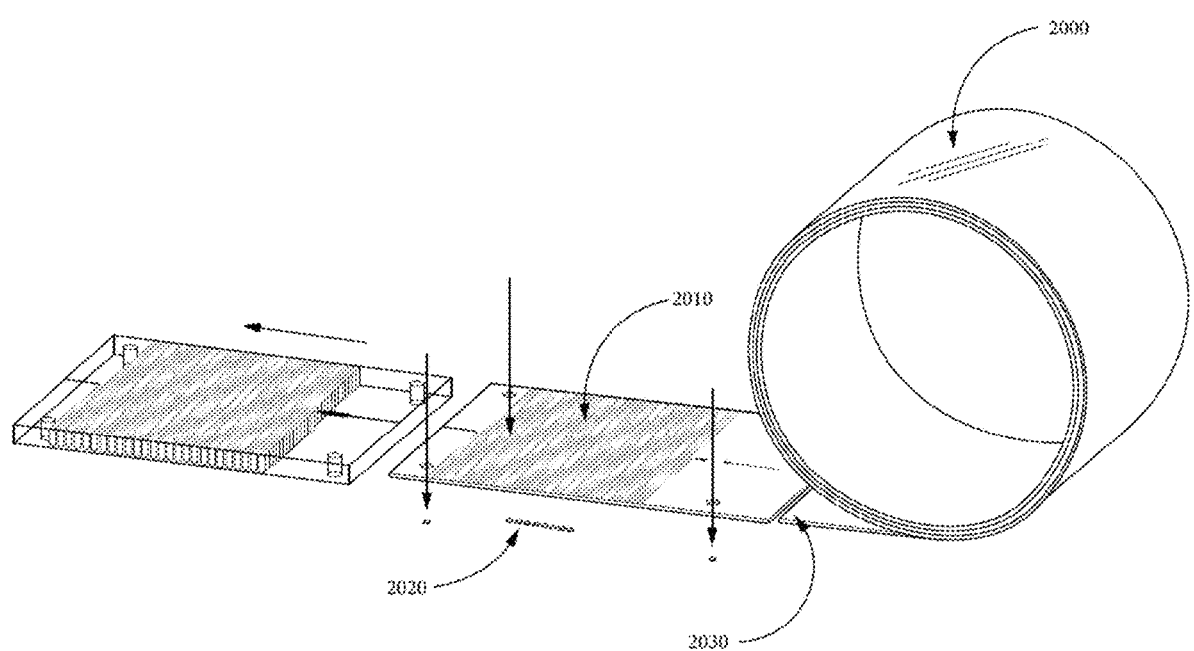
FIG. 3 shows a perspective view of a full and partially formed multi-layer, flat glass structure wherein a linear GC column is formed from the flat glass.
Figure 4:
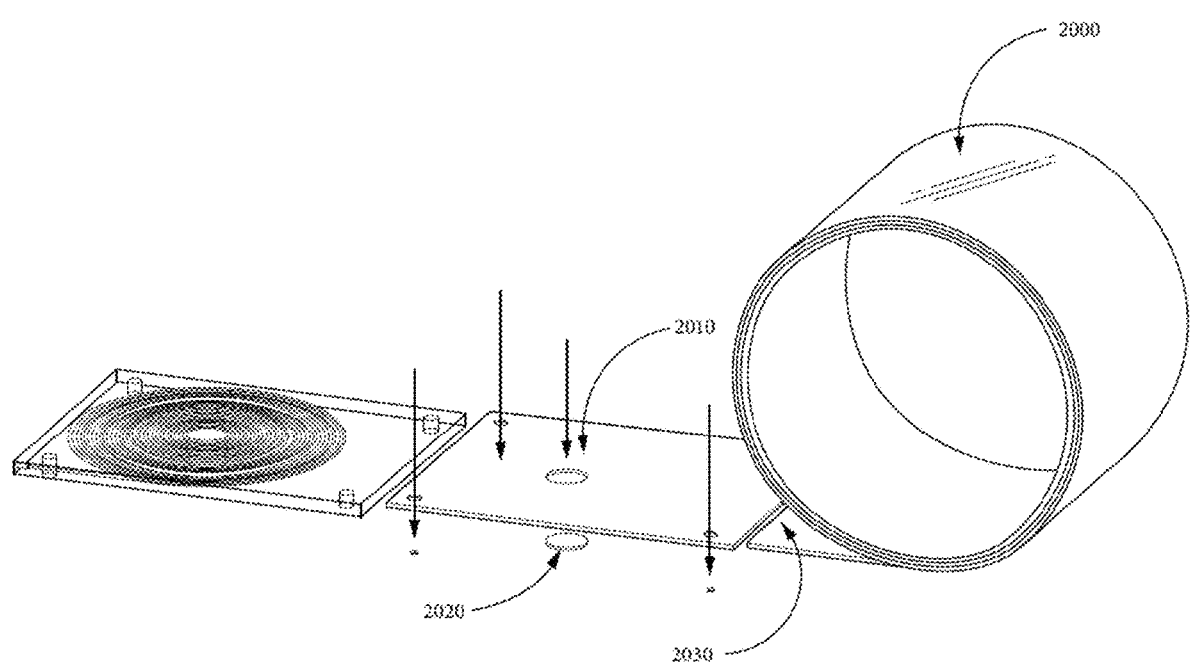
FIG. 4 shows a partially formed multi-layer, flat glass structure wherein a spiral GC column is formed from the glass.

FIG. 3 shows a partially formed flat glass structure that if forming a linear GC column. As can be seen in this figure, flat glass has been unwound from a spool of glass 2000, a laser pattern 2010 has been formed, the cut-outs 2020 have dropped away, a cut line 2030 has been made (see the line near the glass spool), and layers have been stacked. The process shown in FIG. 3 is repeated until the desired number of layers have been cut and stacked. FIG. 4 shows how a spiral column is formed.

One of the advantages of the present manufacturing process is that each layer can be patterned the same or differently from other layers. The process can be automated by pre-programming the pattern into a computer-controlled laser. The unrolling, cutting, stacking, etc. can all be automated, thereby allowing for high-speed, precision manufacturing of the present flat-glass structures.

In another aspect, fusing is performed using ultrasound and/or applying pressure. In another aspect, the fusing step is performed by pressing the layers of the structure together with enough pressure that the layers fuse (adhere) to one another. In another aspect, the integrity of the stack is maintained by the alignment frame while pressure is applied. This is to ensure that the layers remain aligned, which can be important if channels or other structures are formed by the stacking.

In another aspect, pressure is applied to the partially completed structure to limit the amount of pressure required to fuse the entire structure. For example, pressure can be applied after every 5, 10, 15, 20, 25, 30, 35, 40, 45, 50, or 100 layers have been stacked.

In another aspect, the top layer is cut and stacked first and the bottom layer is cut and stacked last. This would be building the structure from the top up as opposed to the bottom up process described above. In another aspect, the optional pattern cutting and cutting a length of flat glass away from the spool can be done simultaneously, sequentially (e.g., from one side to another), or in parts or segments.

As described above, the present multi-layer glass structures can comprise various components (e.g., sensors, batteries, and wiring). One way to include components in the structure is to add them as the layers of glass are stacked. The patterns created in the glass layers can result in cavities/openings as layers are stacked. The cavities/openings allow for components to be installed during stacking.

In another aspect, the method, further comprises l. installing one or more components into a cavity formed by at one or more internal layers. This installing step can occur at any time during the stacking of internal layers (or before or after if the top and/or bottom layer has a cut-out in it). It can also occur multiple times in order to assemble a multi-component system. Cavity includes individual or multiple small holes (e.g., channel(s) and via(s)) and individual or multiple larger cut-outs (e.g., circular, square, and rectangular openings), which can form a chamber(s). For example, the battery of a cellular phone could be located near the bottom of the structure and an LED screen could be located at the top of the structure. The battery would be installed before the LED in a bottom up build (and vice versa). Electrical contacts, wiring, etc. could be installed throughout the stacking process (multiple installing steps). Fusing of the glass structure could occur before each component is installed (multiple fusing steps), after each component is installed (multiple fusing steps), or after the stacking is complete (one fusing step).

In another aspect, the method, further comprises m. placing a first modified layer onto the stack. In this aspect, a flat glass layer is modified before or during the manufacturing process and placed onto the stack as the structure is made. This allows one to maintain a high-speed process without stopping to modify a layer (e.g., deposit metal traces). The layer to be modified can come from the same flat glass roll being used to form the structure, from a different roll, or a different source (e.g., a large sheet onto which a plurality of modifications is made). Examples of the modifications include building an integrated circuit or sensor on a glass layer and forming metal traces onto the layer (e.g., metal deposition or via an etching method). By having a supply of modified layers on hand, structures can be rapidly made with the modified layer (or layers) being placed on the stack at the appropriate time (first (top/bottom), last (top/bottom), or somewhere in the middle). In another aspect, the method, further comprises n. placing a plurality of modified layers onto the stack. Examples of the number of modified layers in this aspect include 2, 3, 4, 5, 6, 7, 8, 9, 10, 11, 12, 13, 14, 15, 16, 17, 18, 19, and 20.

By forming the glass structure as two or more modified layers, at least one component can be encased in the structure by placing the component(s) into (onto) one layer and then bringing the other layer into contact and fusing them together. As an example, a radiation sensitive beacon (e.g., sensor, battery, and transmitter) could be enclosed in a multi-layer glass structure by first forming a top half and bottom half, placing the beacon between the halves, and then fusing the halves together. As noted above, if it is necessary to be able to open the structure to repair or replace components (e.g., faulty battery), the plurality of structures can be mechanically connected (e.g., corner clips, screws, bolts, mechanical snaps, etc.). To prevent fusion of two structures, a spacer (e.g., rubber gasket) can be used between the two structures.

Figure 5:
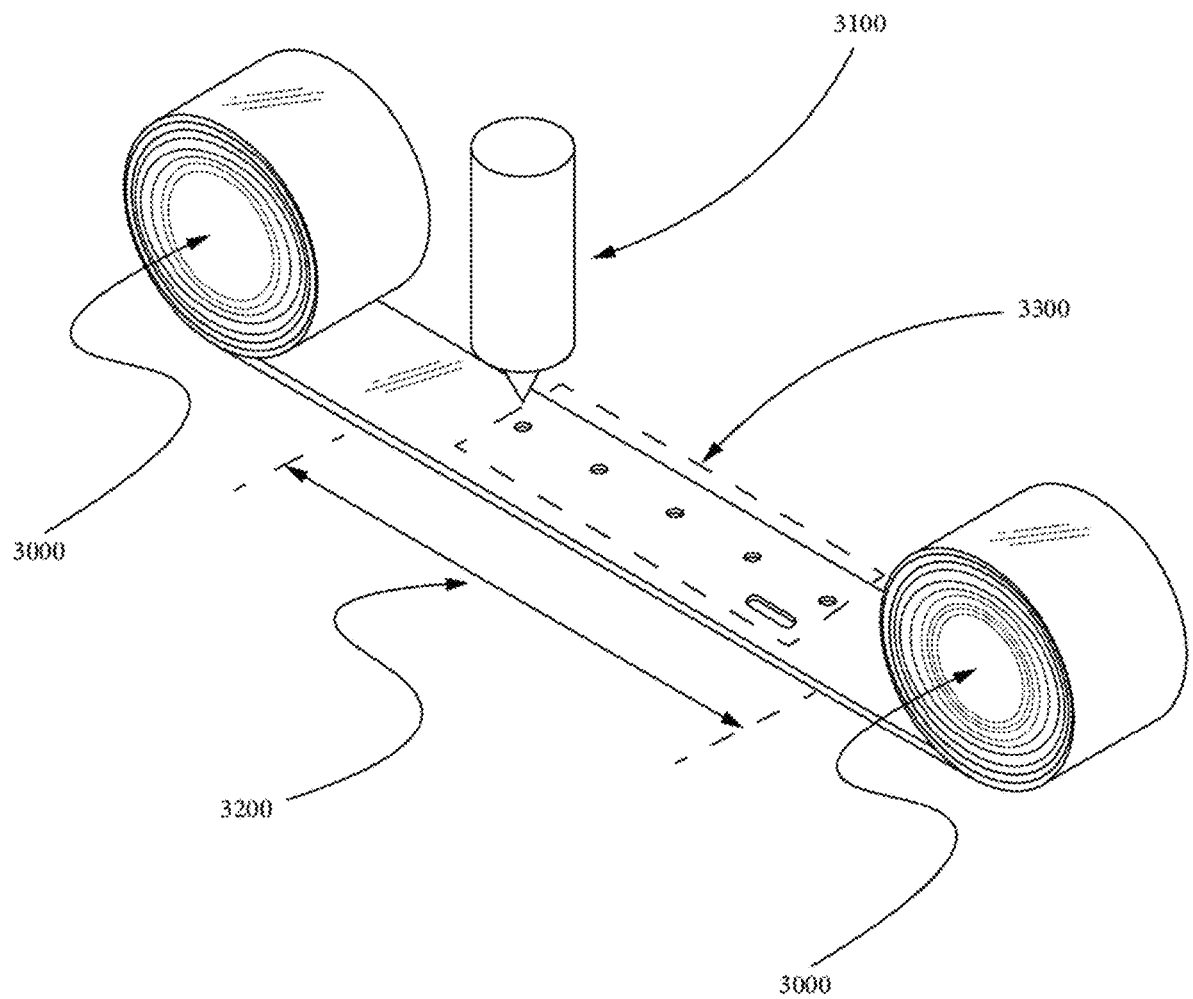
FIG. 5 shows a diagram of a reel to reel process for making a cylindrical flat glass structure.

In another embodiment, the single or multi-layer, flat glass structure is a patterned, multilayer roll of flat glass that is formed from a first roll of flat glass that is unrolled from a first spool, optionally cut (patterned), and then rolled onto a second spool to form a unitary cylindrical structure that is patterned, multi-layer of flat glass as shown in FIG. 5. In this aspect, each "layer" as described above is a singular turn of glass in the patterned, fused, multi-layer roll (as opposed to a single, separate length of glass).

In another aspect, the present invention provides a novel patterned, multi-layer, roll of flat glass: comprising a multi-layer roll of flat glass, comprising, at least a plurality of layers that are missing at least one portion of glass, wherein the layers of flat glass are fused together; and the roll is cylindrical. A layer is one turn or circumference of the cylinder. In addition, the cylindrical roll has a hollow (open) center (see FIG. 5). This opening can be equivalent to the diameter of a spool, if one is used in the process of manufacture.

In another aspect, a plurality of portions of glass (cut-outs) are missing from a plurality of the layers (not shown). In another aspect, a plurality of the missing glass portions in the plurality of layers are aligned to form a channel(s) (e.g., via) and/or a chamber(s). In another aspect, the roll, comprises at least 10 layers. In another aspect, the roll, comprises at least 50 layers. In another aspect, the roll, comprises at least 100 layers.

An advantage of the cylindrical roll is that a "reel to reel" process can be shown in FIG. 5. The space between the reels is variable can be set based on the size and speed of the laser cutting 3100 and also if components are being deposited (e.g., metal deposition or soldering) onto the unrolled section prior to rolling onto the second reel.

Figure 6:
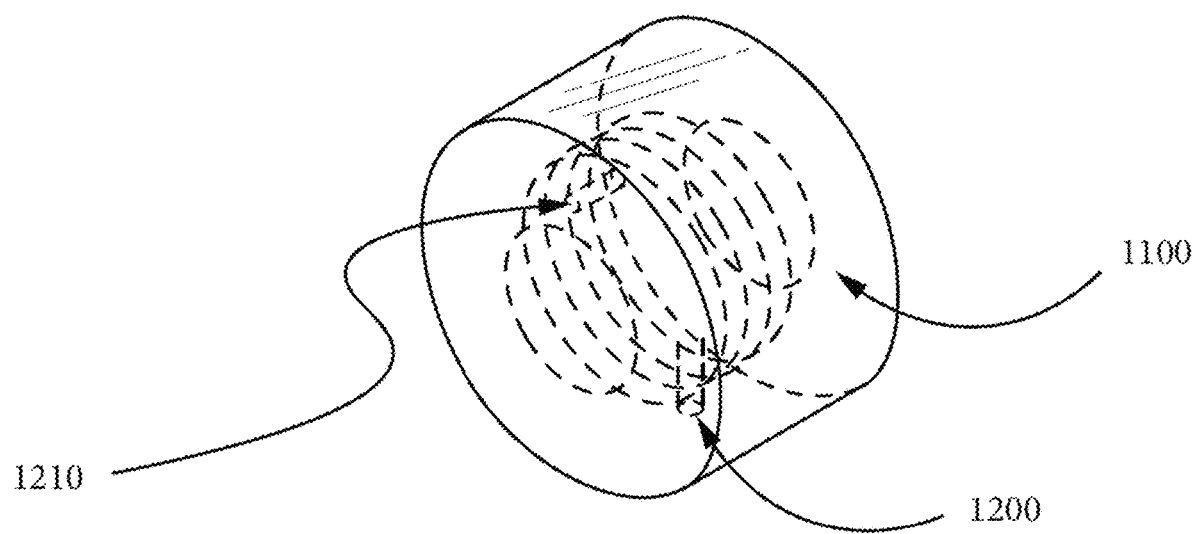
FIG. 6. shows a perspective view of a cylindrical, multi-layer, flat glass structure.

In another aspect, the present invention provides a novel method of manufacturing a cylindrical, multi-layer, flat glass structure, the method illustrated in FIG. 5 comprising a. unrolling a length 3200 of flat glass from a first spool 3000, comprising: a first roll of flat glass; b. optionally cutting a desired pattern 3300 into the length of glass; c. rolling the optionally cut length of glass onto a second spool 3000 to form a second roll; d. repeating steps (a)-(c) until the desired structure is formed by the second roll; and e. optionally, cutting away the remainder of the first spool from the second spool and optionally rolling any remainder onto the second roll, wherein at least one portion of glass is missing from a plurality of the layers. FIG. 6 shows a view of the unitary cylindrical, multi-layer flat glass structure after it is completed.

In the cylindrical structure, the flat glass has a plane curve shape (e.g., has been wound around a spool). In another aspect, the process of rolling the glass onto the second spool causes it to fuse to adjacent layers of the roll. In another aspect, the cylinder is formed from one, continuous piece of flat glass. In another aspect, the cylinder comprises flat glass having a plurality of thickness (e.g., 2, 3, 4, 5, or 6 different thickness). For a cylinder with a plurality of thicknesses, the first thickness comes from the first roll used to make the cylinder, the second thickness comes from a second roll, the third thickness, if present, comes from a third roll. This is accomplished by using a first roll, then continuing the rolling with the next roll. The ends of the first roll and beginning of the next roll can be touching or a space can be left. This is repeated for each subsequent roll. The remainder of the description of non-cylindrical multi-layer, flat glass structures applies to the cylindrical structures (except where incompatible with a cylindrical structure).

Figure 7:
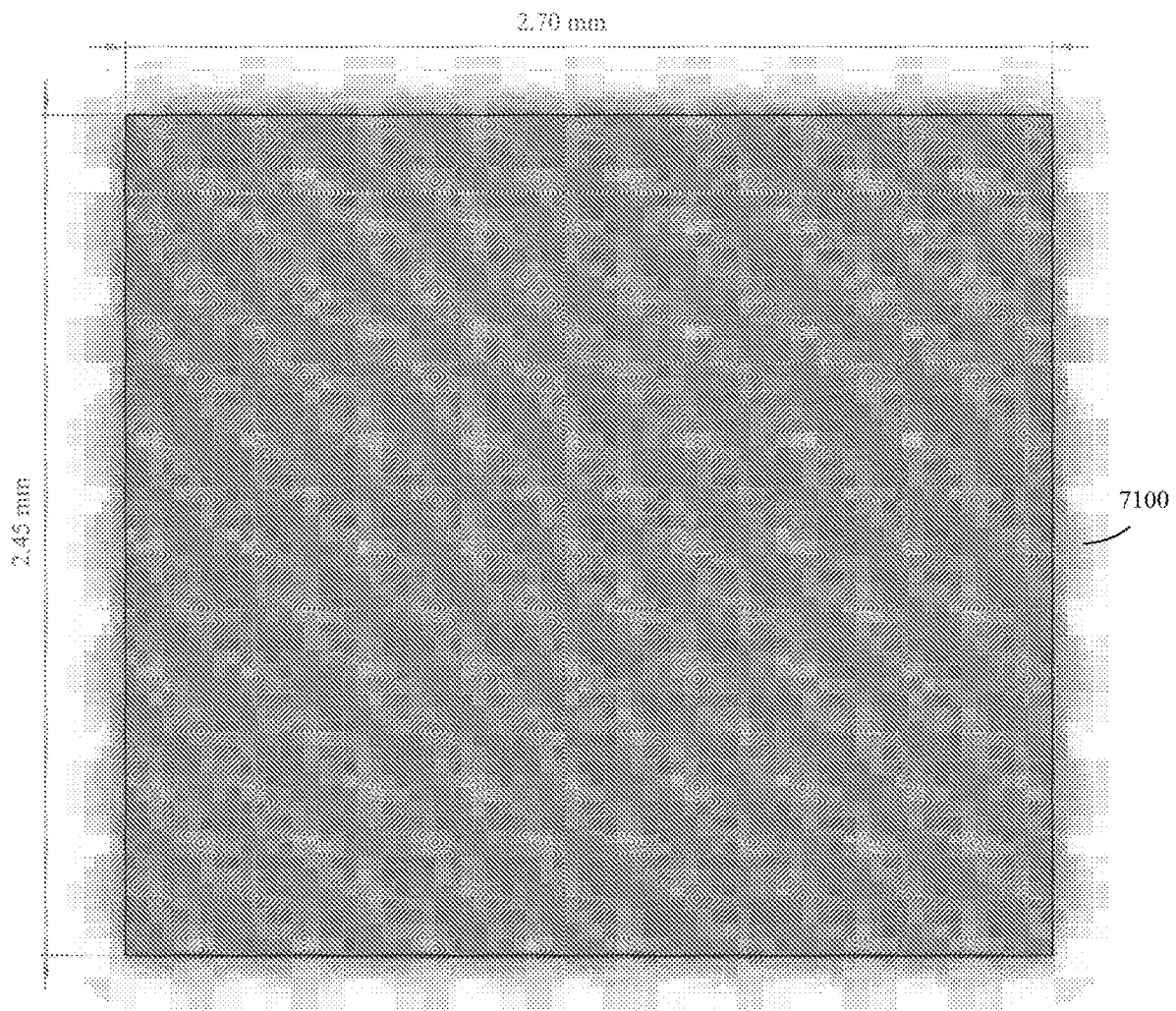
FIG. 7. shows sample dimensions in mm of a piece of flat glass.
Figure 8:
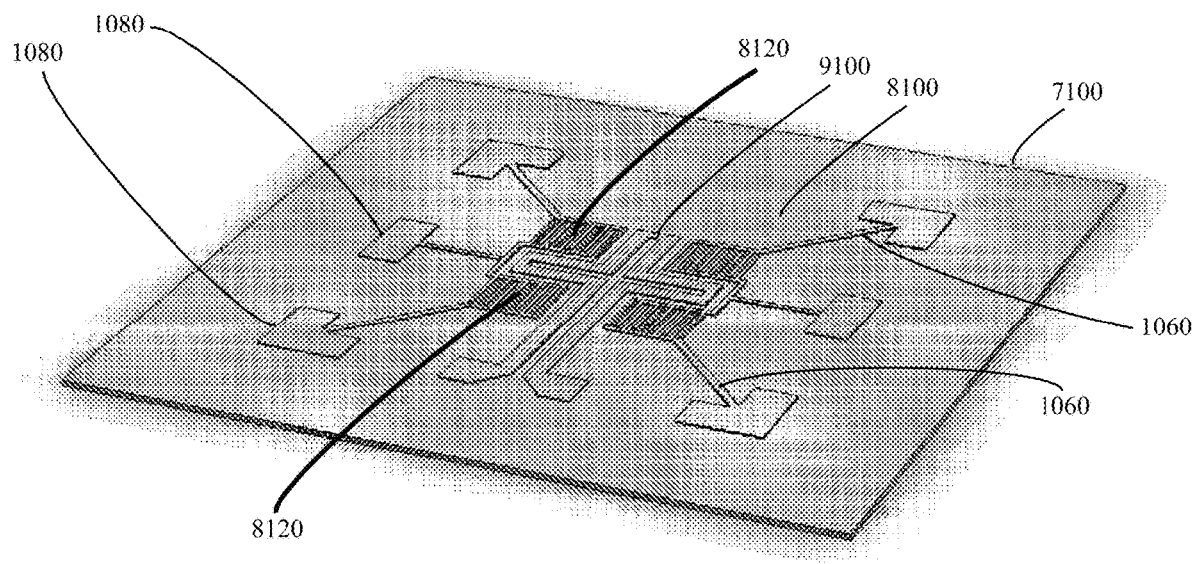
FIG. 8 shows an embodiment of single layer flat glass sensor structure.
Figure 9:
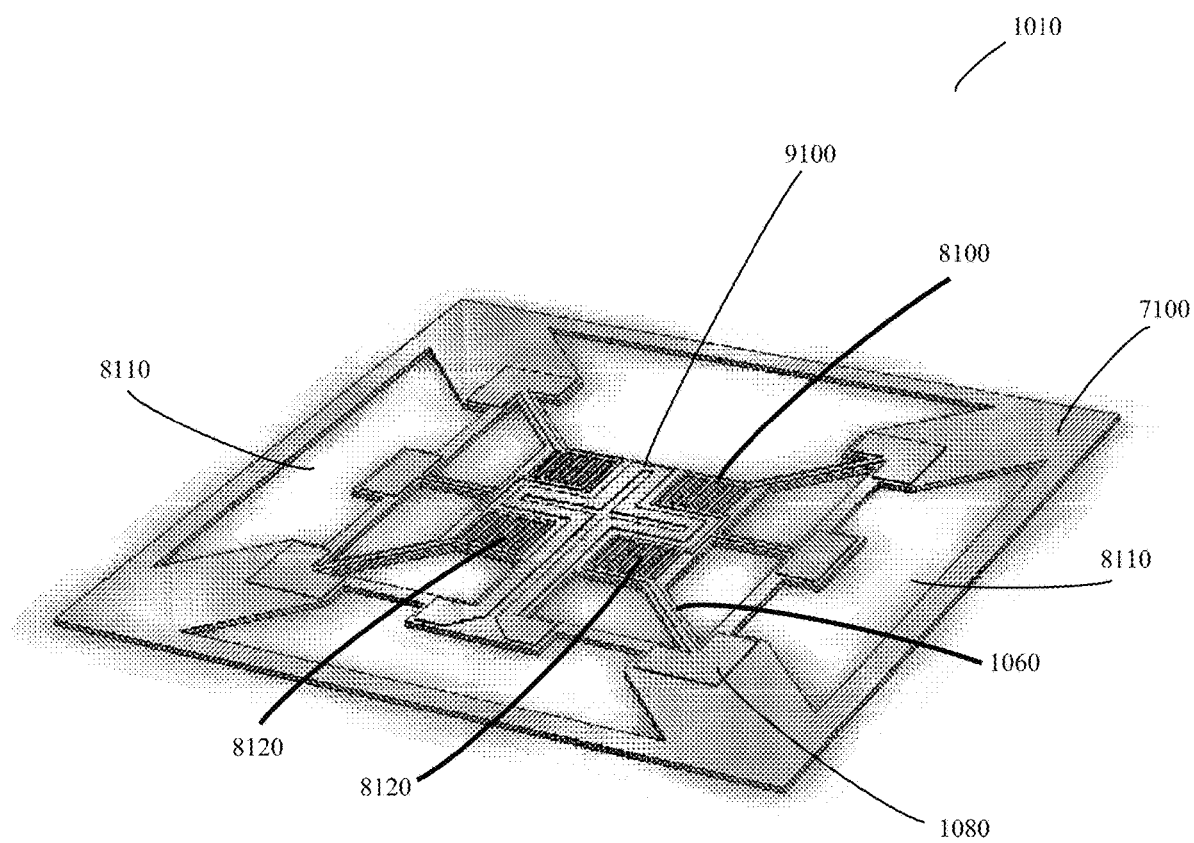
FIG. 9 shows an embodiment of single layer flat glass sensor structure with cutouts on the flat glass layer.

FIG. 7. shows sample dimensions of a piece of flat glass 7100. FIG. 8 shows an embodiment of single layer flat glass 7100 with sensor 8100. FIG. 9 shows a single layer glass sensor structure 1010 comprising a single layer flat glass 7100 with a plurality of cutouts 8110, a sensor 8100 and a heater 9100. The cutouts 8110 increase temperature insulation and isolation of the sensor 8100. In other words, removal of the glass near the edges of the sensory element helps to isolate the sensor from the glass-sensor structure. Isolating the sensor can provide benefits such as thermal stability and decreased power consumption. In one embodiment, the flat glass 7100 comprises a reflective surface on its top or bottom; and, a sensory element.

In one embodiment shown in FIG. 9, the glass-sensor structure 1010 is hereafter interchangeably referred to as "Layer A" 1010 comprising the flat glass 7100 with cutouts 8110, sensor 8100 and heater 9100. In one embodiment shown in FIG. 9, the single glass-sensor structure 1010 is a unitary structure and/or device. In one embodiment shown in FIG. 10A, the glass-sensor structure further comprises from 1-4 additional glass Layers B 1020, Layer C 1030, Layer D 1040 and/or Layer E 1050 which are directly or indirectly in contact with Layer A 1010 forming a multi-layer glass-sensor structure 8185 is a unitary structure and/or device 8185.

In one embodiment, Layer B 1020 is a flat glass layer located on top of and at least partially in contact with Layer A 1010. Layer C 1030 is a flat glass layer located on top of and at least partially in contact with Layer B 1020, if present, or Layer A 1010. Layer D 1040 is a flat glass layer located on the bottom of and at least partially in contact with Layer A 1010. Layer E 1050 is a flat glass layer located on the bottom of and at least partially in contact with Layer D 1040. In one embodiment shown in FIG. 10A, FIG. 10B and FIG. 11A, the multi-layer glass-sensor structure 8185 is a unitary structure and/or device.

In another aspect, the present invention provides a novel glass-sensor structure, wherein Layer A 1010 comprises a plurality of sensors. Examples of plurality include 2, 3, 4, 5, 6, 7, 8, 10, 11, 12, 13, 14, 15, 16, 17, 18, 19, 20, 21, 22, 23, 24, 25, 26, 27, 28, 29, 30, 32, etc. The number of sensors on Layer A 1010 is only limited by the starting size of Layer A 1010 and the size of each individual sensor. A single layer glass sensor 1010 comprising a plurality of sensors, can be cut into multiple sensor glass layers and or unitary devices. For example, if there are 64 sensory elements on Layer A 1010 then this structure can be cut into 16 glass sensor layers, each with 4 sensors thereon. In another example, the 64-sensor structure can be cut into 4 glass sensor structures each with 16 sensory elements. In another example, the 64-sensor structure can be cut into 64 sensor glass layers, each with 1 sensor. In another aspect, parts of a sensor can be present on the top, bottom or in plane with the flat glass layer 7100 in a single layer glass sensor structure 1010 or a multi-layer glass sensor structure 8185.

In one embodiment, the present invention provides a novel glass-sensor structure, wherein the sensory element is in contact with at least a portion of the top of Layer A 1010 and has a smaller surface area than Layer A 1010. In another aspect, the sensory element is built directly onto the top of Layer A 1010. In another aspect, the sensory element is attached (e.g., glued) to the top of Layer A 1010. In another aspect, a middle portion of Layer A 1010 located under the sensory element is absent.

Figure 10A:
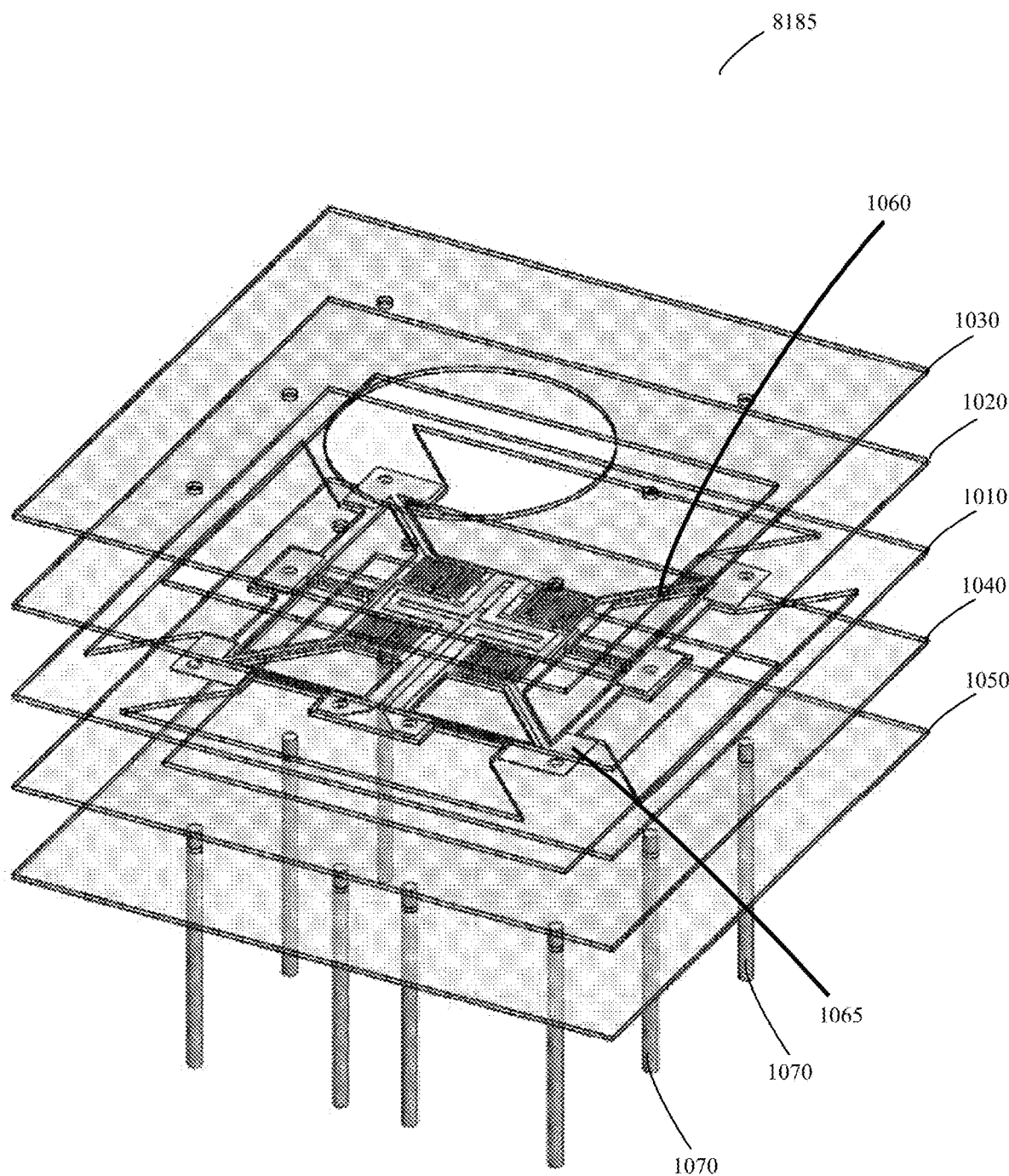
FIG. 10A shows an expanded view of an embodiment of multi-layer flat glass sensor structure.

In one embodiment, the present invention provides a novel glass-sensor structure, wherein Layers B 1020 and C 1030 are present. As shown in FIG. 10A, a middle portion cutout 8100 of Layer B 1020 and/or Layer C 1030 is absent, such that an inner portion of Layer B 1020 is near the edges of the sensory element. Typically, when the sensor is on top of Layer A 1010, Layer B 1020 is not in contact with the sensor. In another aspect, there is a least one channel in Layer B 1020 (and/or Layer E 1050 when present) from an outside edge through to an absent middle portion. This channel forms an environmental connection and allows for gasses to flow into or out of the space between layers A 1010 and C 1030 (and/or A 1010 and E 1050), which is formed by the absence of a middle portion cutout 8110 of Layer B 1020 and/or Layer D 1040.

In another aspect, the present invention provides a novel glass-sensor structure, wherein a middle portion of Layer C 1030 is absent. A middle portion of Layer C 1030 being absent connects the sensor 8100 to the environment when the absent portions of Layers and B 1020 and C 1030 at least partially overlap. In another aspect, the reflective surface is present on Layer C 1030. In another aspect, the reflective surface is on top of Layer C 1030. In another aspect, the reflective surface is on bottom of Layer C 1030. One of ordinary skill in the art can configure the multiple layers with sensor location, cutouts, ports and or channels as required for a specific device and or system.

In one embodiment, the present invention provides a novel glass-sensor structure, wherein the sensor is in the same plane as Layer A 1010 and is housed in an opening in the middle of Layer A 1010 that is at least the size of the sensor. In this aspect, Layer A 1010 "houses" the sensor by having an opening in it that is large enough to fit the sensor. This opening can be just large enough to fit the membrane (e.g., at least the size of the sensor sub-areas 8120) or large enough that the sensor 8100 contacts the flat glass 7100 only through the glass connectors 1060.

In another embodiment, the membrane contacts the flat glass 7100 via the heater 9100. That is the heater 9100 is in direct contact with the flat glass 7100 and the membrane is in contact with the flat glass 7100 directly through the glass connectors 1060 and indirectly via the heater 9100. In one embodiment, the heater 9100 is in direct contact with the flat glass 7100 but not directly contact with the sensor 8100. The sensor 8100 can be indirectly heated via the flat glass 7100.

FIG. 10A shows one embodiment in which Layer A 1010 has one or more (e.g., a plurality of) contact points 1065 with the flat glass 7100. In one embodiment, these contact points 1065 are edge-to-edge contact points (i.e., an edge portion of sensor 8100 with an edge portion of the flat glass 7100). For example, an edge of a protrusion or tab in the middle of the flat glass 7100 can be in contact with an edge of the sensor 8100 (not shown). Examples of the number of these contact points include 1, 2, 3, 4, 5, 6, 7, 8, 9, 10, or more. The contact can also be continuous. For example, one complete edge (e.g., one side of a square or rectangular shaped sensor) of the sensor can be in contact with an edge of flat glass 7100. In another example, all four edges of a square, rectangular, or similarly shaped sensor, can be in contact with a flat glass layer 7100. In one embodiment, the above can readily be applied by substituting flat glass layer 7100 with Layer A 1010 and/or any of the Layers B 1020-E 1050. That is placing any sensor 8100 in plane with Layers A 1010, B 1020, C 1030, D 1040, and/or E 1050 or any combination of Layers A 1010, B 1020, C 1030, D 1040 and/or E 1050 are embodiments contemplated by the present invention.

One of the problems encountered when sensors are placed in the real world is damage caused to the sensor by the environment. The damage can be caused by weather (e.g., rain or humidity), dust, light, etc. A way to prevent, slow, or limit sensory element damage is to limit its exposure to the environment. Exposure of the sensor to its surrounding environment can be limited by one of Layers B, C, D, and/or E acting as a "cover" for (or "covering") the sensory element. Covering can be achieved by one of Layers A, B, C, D, and/or E being movable. Thus, in another aspect, at least one of Layers A, B, C, D, and E and/or any combination of these Layers is movable.

Movement may be by rotation, side-to-side motion (e.g., a layer slides in one direction to expose the sensory element to the environment and back to close) and/or up and down motion (e.g., a layer (or an edge thereof) lifts are raises far enough to allow environmental exposure and then settles back down to close). There are numerous ways to drive movement. For example, the movement can be driven by a lever, piezoelectric, magnetics, etc. In addition, the glass-sensor structure itself can be moved (e.g., tilting or shaking or inverting) to expose the sensor.

In another aspect, the present invention provides a novel glass-sensor structure as described above, further comprising: a plurality of mechanical pins 1070. In one embodiment, these mechanical pins 1070 pass through the middle layers of the glass-sensor structure and at least into the top and bottom glass layers. In another embodiment, one or more of the mechanical pins 1070 pass through at least one of the top or bottom glass layer and extend beyond the glass-sensor structure. A benefit of at least one or more pins 1070 extending beyond the structure (e.g., extending beyond the bottom glass layer) is that it allows for external electrical connection with the sensor 8100.

In another aspect, the mechanical pins 1070 are electrically conductive and are in electrical connection either directly or indirectly with the sensor 8100. In another aspect, the plurality of mechanical pins 1070 extend beyond the bottom glass layer 7100 of the glass-sensor structure, are electrically conductive, and are in electrical connection with the sensor 8100.

Figure 10B:
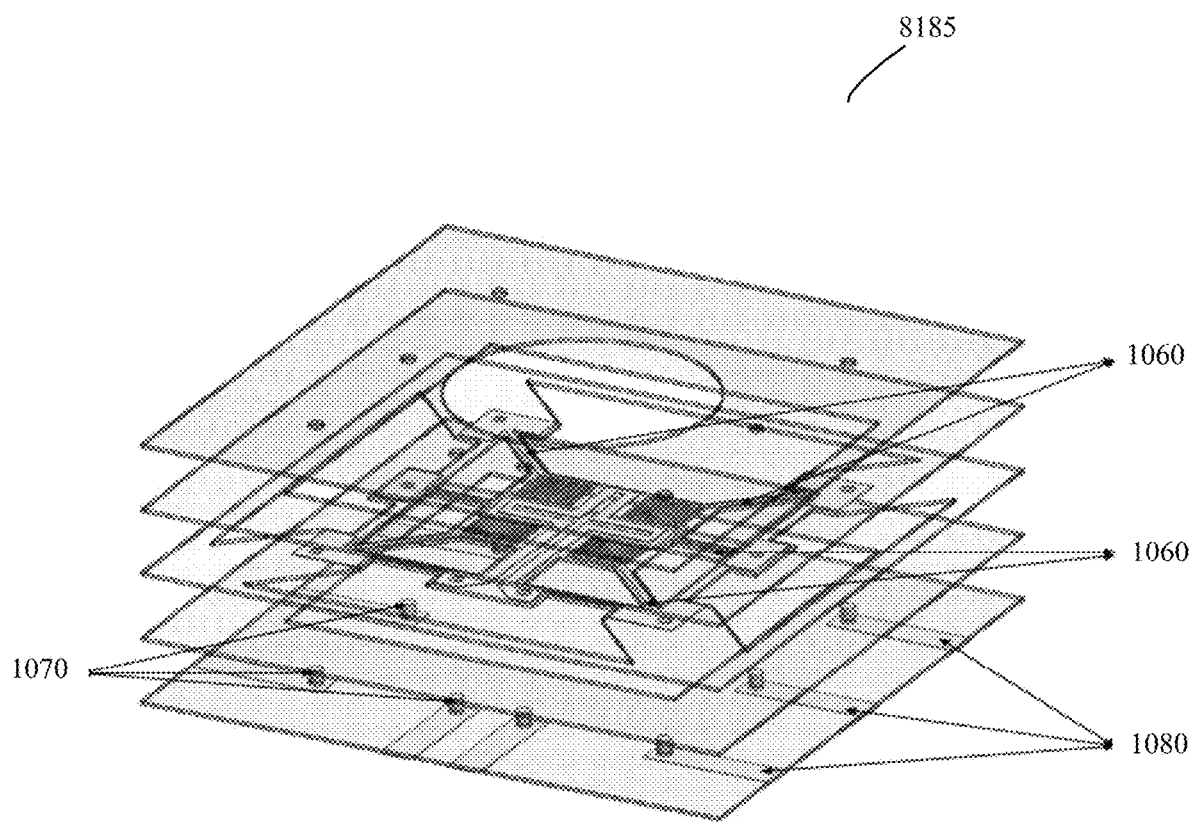
FIG. 10B shows an expanded view of an embodiment of multi-layer flat glass sensor structure.
Figure 11A:
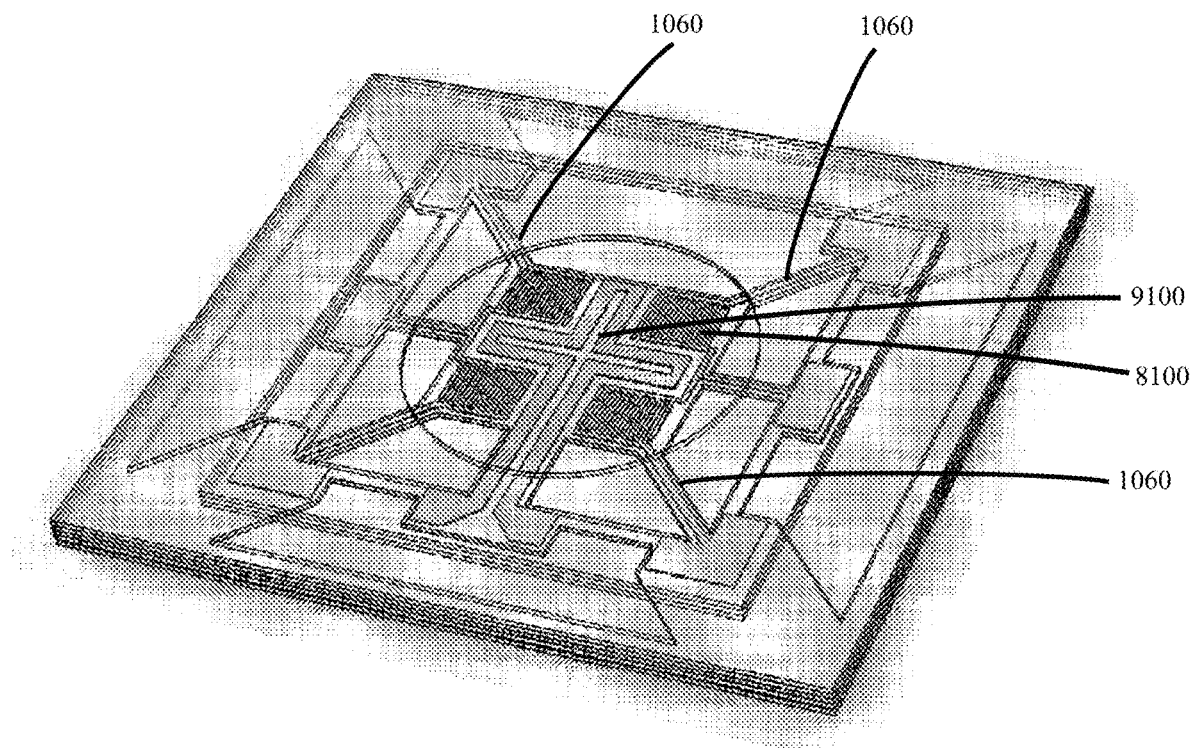
FIG. 11A shows a collapsed view of an embodiment of multi-layer flat glass sensor structure.
Figure 11B:
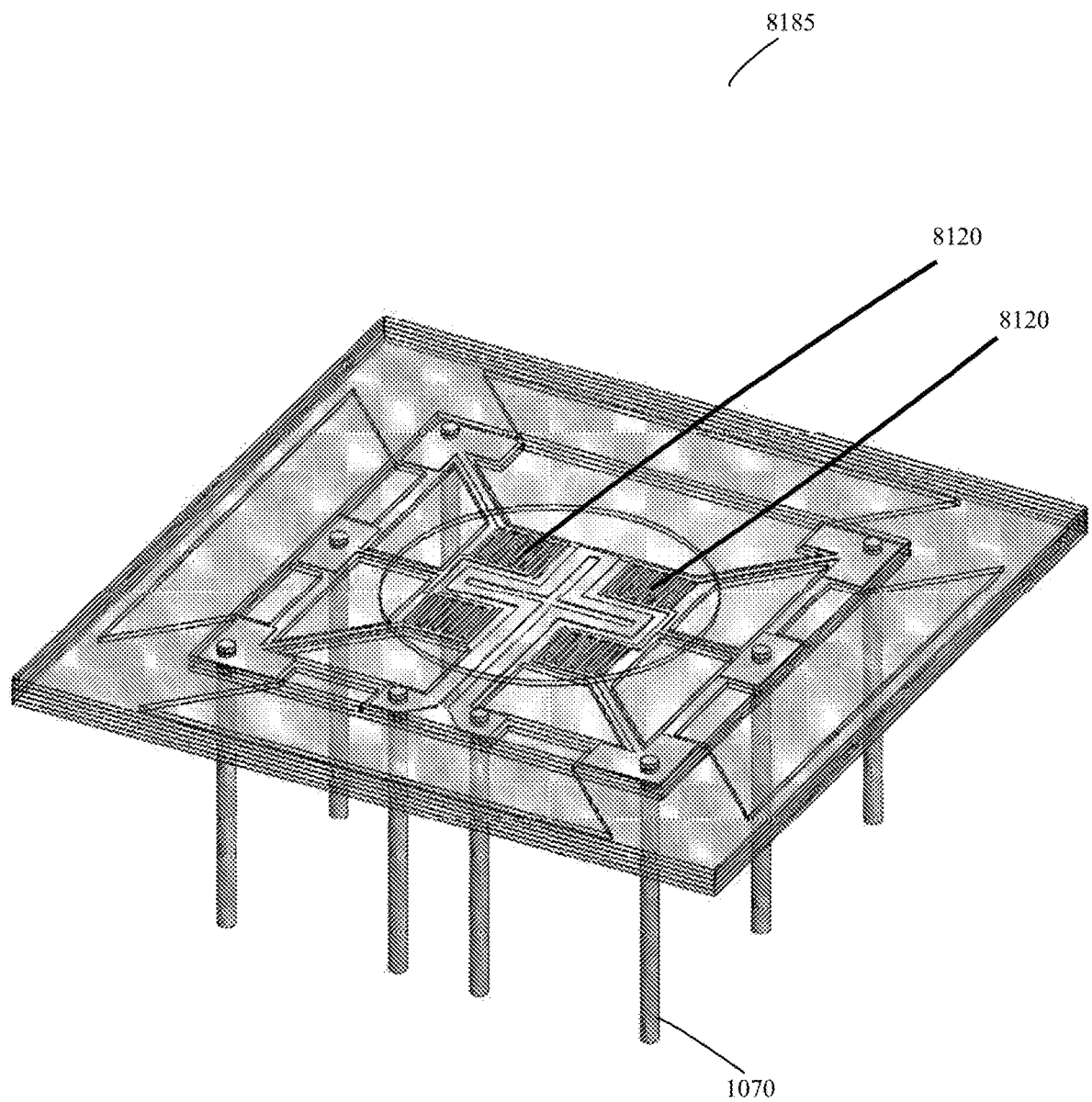
FIG. 11B shows a collapsed view of an embodiment of multi-layer flat glass sensor structure.

FIG. 10B shows a novel glass-sensor structure as described above, further comprising a plurality of mechanical pins 1070 and a plurality of surface mount pads 1080, wherein the pads are located on top of the bottom layer (e.g., Layer E 1050) and are in electrical connection with the mechanical pins 1070. Typically, when surface mount pads 1080 are present, the mechanical pins 1070 are electrically conductive and pass into the outermost layers of the structure, but do not substantially extend beyond these outermost layers. The pins 1070 are useful as mechanical connectors and can facilitate the electrical connection of the sensor portion of the glass-sensor to external components (e.g., power source, detector, etc.). FIG. 11A is a collapsed view of a multi-layer glass-sensor structure 8185 of FIG. 10B. FIG. 11B is a collapsed view of the multi-layer glass-sensor structure 8185 with pins 1070 FIG. 10A.

Figure 12A:
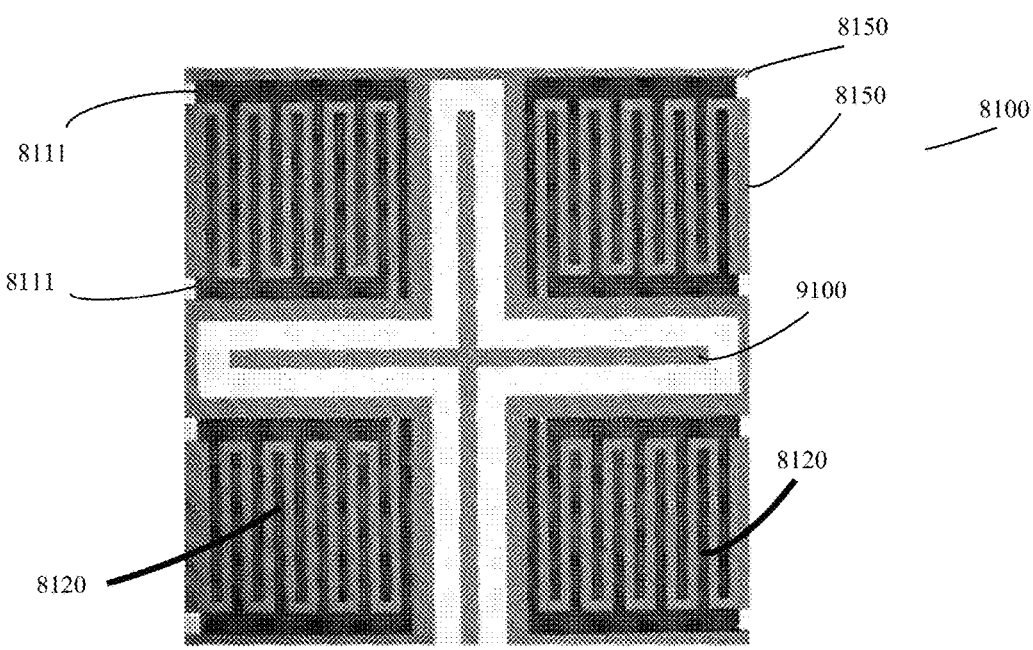
FIG. 12A shows an embodiment of the membrane and four sensory sub-areas.
Figure 12B:
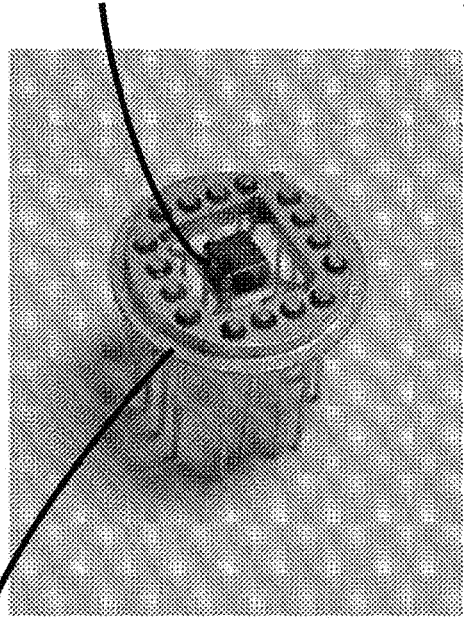
FIG. 12B shows a multi-layer multi-sensory glass sensor structure connected to the transistor outline "TO" package.
Figure 12C:
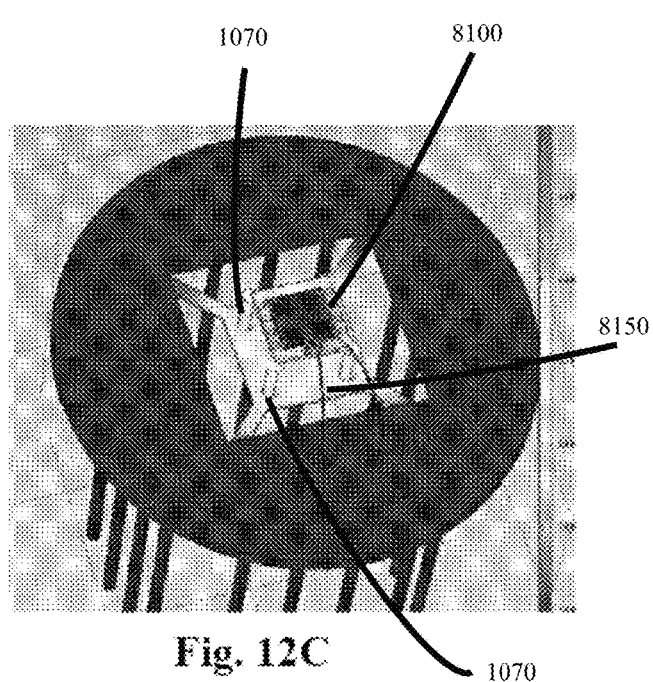
FIG. 12C shows the temperature insulation of multi-layer multi-sensory glass sensor structure from the TO package with the multi-layer multi-sensory glass sensor structure suspended on thin metal legs.

FIG. 12A shows the membrane 8100 with four sensory sub areas 8120 and a cross-shaped heating element 9100. FIG. 12B shows a multi-layer multi-sensory glass sensor structure 8185 connected to the transistor outline "TO" package 8180. FIG. 12C shows temperature insulation of the multi-layer multi-sensory glass sensor structure 8185 from the TO package 8180 with the multi-layer multi-sensory glass sensor structure 8185 supported on thin metal legs 1070.

More specifically, FIG. 12A shows a novel chemical sensor 8100. In one embodiment, the sensor 8100 comprises membrane 8111, comprising a flat glass layer 7100 (not shown) which comprises a sub-sensor area 8120, a heating element 9100 in contact with the flat glass layer 7100 and located near at least one edge of the sensor sub-areas 8120; a pair of electrical leads 8150 in contact with the flat glass layer 7100 and at least partly located on the sensor sub-areas 8120; and a metal oxide layer 8160 (not visible) located on the sub-sensor area 8120 and in contact with at least a part of the pair of electrical leads 8150 and the flat glass layer 7100; and a bimetal layer 8170 (not shown) in contact with the metal oxide layer 8160 (not shown) comprising: Au and Pd.

In one embodiment, the sensor 8100 is an electrochemical wafer comprising a metal oxide layer in contact with at least a part of a pair of electrical leads 8150 and the flat glass layer 7100; and, a bimetal layer in contact with the metal oxide layer and comprising: Au and Pt.

In another aspect, the sensor 8100 is an electrochemical wafer comprising a metal oxide layer located on the sensor sub-area 8120 and in contact with at least a part of the pair of electrical leads 8150 and the flat glass layer 7100; and, a bimetal layer in contact with the metal oxide layer and comprising: Au and Pd.

In another aspect, the sensor 8100 is an electrochemical wafer comprising a plurality of bimetal layers, wherein 1 bimetal layer is located in each sensor sub-area 8120 and is in contact with the metal oxide layer in that area, wherein the bimetal layer, comprises: Au and Pt.

In another aspect, the sensor 8100 comprises 4 separate sensor sub areas 8120, 1 heating element 9100, 4 pairs of electrical leads 8150, 4 metal oxide layers and 4 bimetal layers. In another aspect, in the sensor comprises 4 separate sensor sub-areas 8120, 1 Pt heating element, 4 pairs of Pt electrical leads, 4 $SnO_2$ (metal oxide) layers, and 4 bimetal layers. In another aspect, the sensor 8100 comprises 4 separate sensor sub-areas 8120, 1 Pt heating element, 4 pairs of Pt electrical leads, 4 $SnO_2$ (metal oxide) layers, 4 bimetal layers, and 4 flat glass connectors 1060.

In another aspect, the sensor 8100 comprising 4 separate sensor sub-areas, 1 Pt heating element, 4 pairs of Pt electrical leads, 4 $SnO_2$ (metal oxide) layers, 4 bimetal layers, and 4 flat glass connectors 1060. In one embodiment, the sensor 8100 comprises 4 separate sensor sub-areas 8120, 1 Pt/Ti (Ti being the $2^{nd}$ material) heating element, 4 pairs of Pt/Ti (Ti being the $2^{nd}$ material) electrical leads, 4 $SnO_2$ (metal oxide) layers, and 4 bimetal layers with or without 4 flat glass connectors 1060.

The bimetal layer being in contact with the metal oxide layer "dopes" the metal oxide layer. Dopes or dopant refers to the surface modification of the metal oxide layer (e.g., $SnO_2$) by the bimetal layer.

In another aspect, the sensor 8100 further comprises: a plurality of flat glass connectors 1060. In another aspect, the membrane further comprises 4 flat glass connectors 1060. The flat glass connectors 1060 are typically the remainder of a flat glass layer. In another aspect, the flat glass connectors 1060 are thicker than the electrochemical wafer with at least one sensory element ("sensory sub-area"). In another aspect, the flat glass connectors 1060 further comprise a flat glass layer on the bottom. The flat glass can be an unmodified portion of flat glass that was used to form the membrane 8100.

In another aspect, the sensor 8100 or 8185 is square and, further comprises: 4 flat glass connectors (one at each corner). In another aspect, the sensor is square and, further comprises 4 flat glass connectors (one at each corner). In another aspect, the sensor platform is square and, further comprises: 4 flat glass connectors (one at each corner). In another aspect, the sensor platform is square and, further comprises: 4 flat glass connectors (one at each corner).

In another aspect, the thickness of the (or independently each) bimetal layer is about 0.5, 0.6, 0.7, 0.8 0.9, 1, 1.5, 2, 2.5, 3, 3.5, 4, 4.5, to 5 nm.

In another aspect, the molar ratio of Au:Pd in the bimetal layer is from 10:1 to 1:1 (91% Au/9% Pd to 50% Au/50% Pd). Additional examples include 9:1, 8:1, 7:1, 6:1, 5:1, 4:1, 3:1, and 2:1. In another aspect, the molar ratio of Au:Pt in the bimetal layer is from 10:1 to 1:1 (91% Au/9% Pt to 50% Au/50% Pt). Additional examples include 9:1, 8:1, 7:1, 6:1, 5:1, 4:1, 3:1, and 2:1.

In another aspect, the Au and Pd are simultaneously deposited via sputtering. In another aspect, the Au and Pt are simultaneously deposited via sputtering.

In another aspect, the (or independently each) metal oxide is selected from: $SnO_2$, $ZnO$, $V_2O_5$, $WO_3$, $TiO_2$, $Al_2O_3$, and $Fe_2O_3$. In another aspect, the (or each) metal oxide is $SnO_2$.

In another aspect, the (or independently each) metal oxide layer is about 5, 10, 15, 20, 25, 30, 35, 40, 45, 50, 55, 60, 65, 70, 75, 80, 85, 90, 95, to 100 nm thick. In another aspect, the (or independently each) metal oxide layer is about 5 to 40 nm thick.

In another aspect, the (or independently each) heating element, comprises: a $1^{st}$ material selected from PC, Au, and polysilicon. In another aspect, the (or independently each) heating element, comprises: Pt.

In another aspect, the (or independently each) heating element is about 50, 100, 150, 200, 250, 300, 350, 400, 450, 500, 550, 600, 650, 700, 750, 800, 850, 900, 950 to 1,000 nm thick. In another aspect, the (or independently each) heating element is about 300 nm thick.

In another aspect, there are more than one heating element 9100 and the (or independently each) heating element, further comprises: a $2^{nd}$ material layer sandwiched between the $SiO_2$ layer and the $1^{st}$ material layer. In another aspect, the (or independently each) $2^{nd}$ material layer, comprises: a metal selected from Ti and Cr. In another aspect, the (or independently each) $2^{nd}$ material layer, comprises Ti. In another aspect, the (or independently each) $2^{nd}$ material layer is about 1, 2, 3, 4, 5, 6, 7, 8, 9, to 10 nm thick. In another aspect, the (or independently each) $2^{nd}$ material layer is about 2 nm thick. In another aspect, the (or independently each) $2^{nd}$ material layer is about 5 nm thick.

In another aspect, the (or independently each) electrical leads 1050 comprise a $1^{st}$ metal layer selected from Pt and Au. In another aspect, the (or independently each) electrical leads, comprise Pt. In another aspect, the (or independently each) electrical leads are about 50, 100, 150, 200, 250, 300, 350, 400, 450, 500, 550, 600, 650, 700, 750, 800, 850, 900, 950 to 1,000 nm thick. In another aspect, the (or independently each) electrical leads are about 300 nm thick.

In another aspect, the (or independently each) electrical leads 1050 further comprise a $2^{nd}$ metal layer sandwiched between the $SiO_2$ layer and the $1^{st}$ metal layer. In another aspect, the (or independently each) $2^{nd}$ metal layer, comprises: a metal selected from Ti and Cr. In another aspect, the $2^{nd}$ metal layer, comprises: Ti. In another aspect, the (or independently each) $2^{nd}$ metal layer is about 1, 2, 3, 4, 5, 6, 7, 8, 9, to 10 nm thick. In another aspect, the (or independently each) $2^{nd}$ metal layer is about 2 nm thick. In another aspect, the (or independently each) $2^{nd}$ metal layer is about 5 nm thick.

In the platform, the number of sensor sub-areas 8120 can vary. Examples include 2, 3, 4, 5, 6, 7, 8, 9, 10, or more. The number of sensor sub-areas 8120 determines the number of pairs of electrical leads 1050, metal oxide layers, and bimetal layers. The number of heating elements 9100 is independent of the number of sensor sub-areas 8120. For example, one heating element 9100 can service more than one sensor sub-area 8120 (e.g., 1 heating element for 4 sensor areas). Examples of the number of heating elements 9100 include 1, 2, 3, 4, 5, or more.

In another aspect, the flat glass layer is about 5, 10, 15, 20, 25, 30, 35, 40, 45, 50, 55, 60, 65, 70, 75, 80, 85, 90, 95, to 100 nm thick. In another example, the flat glass layer is about 50 µm thick. In another example, the flat glass layer is about 100 µm thick.

In another aspect, the flat glass layer is about 200, 250, 300, 350, to 400 nm thick. In another aspect, the flat glass layer is about 300 nm thick. In another aspect, the thickness of the flat glass layer is from 50, 100, 150, 200, 250, 300, 350, 400, 450 to 500 µm. In another aspect, the membrane thickness is 200 sm. In another aspect, the membrane thickness is 100 sm.

The present invention is a single and multi-layer flat glass-sensor structure and method of making the flat glass-sensor structure. The flat glass sensor structure comprises at least one flat glass layer, a sensor and a heater. The flat glass layer has a plurality of cutouts that are configured to "suspend" the sensor on top of or in plane with the flat glass layer. The sensor is an electrochemical wafer with at least one sensory element and flat glass connectors. Each flat glass connector is in minimal contact with at least one sensory sub-area. The heater is a resistive heating element that is on top of or in plane with the flat glass layer configured to heat the sensor. The flat glass connectors are configured to provide support for electrical leads to the heater and membrane. The flat glass connectors are also configured to provide temperature insulation of the suspended sensor.

Numerous modifications and variations of the present invention are possible in light of the above teachings. It is therefore to be understood that within the scope of the appended claims, the invention may be practiced otherwise that as specifically described herein.

What is claimed is:

1. A flat glass-sensor structure comprising:
   at least four flexible flat glass layers comprising at least one cavity housed but not contained by overlapping openings through at least two of the flat glass layers;
   at least one sensor operably coupled with the at least one cavity, said at least one sensor comprising:
      a membrane with at least one sensory sub-area and a plurality of flat glass connectors, wherein each flat glass connector of the plurality of flat glass connectors is in contact with the at least one sensory sub-area; and
      a resistive heating element that is on top of or in plane with one of the flat glass layers.

2. The flat glass-sensor structure of claim 1, wherein the at least one sensor is within the at least one cavity.

3. The flat glass-sensor structure of claim 1, wherein the flat glass-sensor structure further comprises at least one alignment hole through at least one of the at least two flat glass layers having overlapping openings.

4. The flat glass-sensor structure of claim 1, wherein the flat glass-sensor structure further comprises at least one alignment post configured in at least one of the at least two flat glass layers having overlapping openings.

5. The flat glass-sensor structure of claim 1, wherein the flat glass-sensor structure further comprises at least one alignment hole in mechanical union with at least one alignment post.

6. The flat glass-sensor structure of claim 1, wherein the flat glass-sensor structure further comprises at least one alignment hole disposed in each layer of a plurality of layers, wherein the at least one alignment hole disposed in one layer of the plurality of layers is in mechanical union with at least one alignment post configured in another layer of the plurality of layers.

7. The flat glass-sensor structure of claim 1, wherein the flat glass-sensor structure further comprises at least one alignment hole disposed in at least one of the at least two flat glass layers having overlapping openings, and at least one alignment post in mechanical union with the at least one alignment hole, wherein the at least one alignment post is configured in a layer distinct from the layer having the at least one alignment hole.

8. The flat glass-sensor structure of claim 1, wherein the flat glass-sensor structure further comprises a pattern cut in at least two stacked layers.

9. The flat glass-sensor structure of claim 8, wherein the flat glass-sensor structure further comprises a different pattern cut in each layer of the at least two stacked layers.

10. The flat glass-sensor structure of claim 9, wherein the at least one cavity further comprises a continuous channel defined by a distinct pattern cut in each layer of the at least two stacked layers.

* * * * *